C. P. WELLMAN.
FEEDER FOR AUTOMATIC WEIGHING MACHINES.
APPLICATION FILED APR. 4, 1913.

1,115,633.

Patented Nov. 3, 1914.
3 SHEETS—SHEET 2.

Witnesses

Inventor
Charles P. Wellman

UNITED STATES PATENT OFFICE.

CHARLES P. WELLMAN, OF WEST MEDFORD, MASSACHUSETTS, ASSIGNOR TO PERCY E. GINN, OF WINCHESTER, MASSACHUSETTS.

FEEDER FOR AUTOMATIC WEIGHING-MACHINES.

1,115,633.  Specification of Letters Patent.  Patented Nov. 3, 1914.

Application filed April 4, 1913. Serial No. 758,749.

*To all whom it may concern:*

Be it known that I, CHARLES P. WELLMAN, a citizen of the United States, residing at West Medford, county of Middlesex, and State of Massachusetts, have invented certain new and useful Improvements in Feeders for Automatic Weighing-Machines, of which the following is a specification.

This invention relates to feeders adapted especially for use in connection with automatic weighing machines having a single weighing receptacle, such feeders having two main elements: 1. An element for effecting a discharge from the hopper into the weighing receptacle of a quantity of the commodity approximating, but slightly under, the desired weight. 2. An element for feeding the commodity into the said weighing receptacle in a drip stream. The first element discharges the commodity rapidly, but intermittently, and the second element slowly, but constantly; the final breaking or tripping of the scale being effected by the drip stream. The first element insures rapidity of the weighing operation, and the second insures accuracy.

My invention relates especially to weighing machines of this general nature capable of handling irregular or coarse commodities comparatively rapidly. Such commodities are represented by the present commercial grades of laundry starch of which it has been found difficult to produce an even discharge from a supply hopper owing to the varying sizes and shapes of the lumps. As the weighing receptacles commonly in use in automatic weighing machines are of somewhat limited dimensions it is customary to feed the commodity to be weighed through a comparatively small discharge opening, and a lumpy commodity discharges through such an opening relatively slowly.

In order to attain a maximum speed in operating a weighing machine it is necessary that the commodity delivered from the intermittent feeder shall approximate as nearly as possible the desired weight, and it is obvious that the less the drip stream feeder has to supply, the shorter will be the intervals between the intermittent discharges. To secure accurate weighing however, it is necessary that the quantities delivered by the intermittent feeder shall at no time exceed the difference in weight between that finally desired and the weight of the commodity discharged by the drip stream feeder during the time the intermittent feeder is discharging. This makes an approximately exact measuring of the intermittent discharges advantageous. In the measuring chambers commonly in use independent top and bottom valves are employed, adapted to operate alternately. These means are likely to become choked by hard lumps, such as starch, and if made sufficiently strong to overcome the irregularities thus occasioned, the added weight of the connecting parts produces friction likely to greatly interfere with the delicate action necessary in such apparatus.

The principal object of my invention is to provide a simple and compact intermittent feeding device capable of handling irregular or coarse commodities comparatively rapidly and in measured quantities closely approximating the desired weight, in conjunction with a constantly operating drip stream feeder.

Other objects of this invention are: To provide a positive safety clutch mechanism between a constant drip stream feeder and the intermittent feeder, to provide means, actuated by gravity, to release a scale from a locking device after the intermittent feeder has come to rest, and to provide such other parts, improvements, and combinations as are hereinafter set forth and claimed.

In the drawings accompanying and forming part of this specification, and in the description of the drawings, I have shown my invention in its preferred form and what I deem to be the best mode of applying the principles thereof: but it is to be understood that I do not confine myself to the exact details of construction shown therein, and that, within the scope of the appended claims, I contemplate changes in form, proportions, and materials, the transposition of parts, and the substitution of equivalent members, without departing from the spirit of my invention.

Similar reference characters indicate like or corresponding parts throughout the several views.

Figures 4, 5:
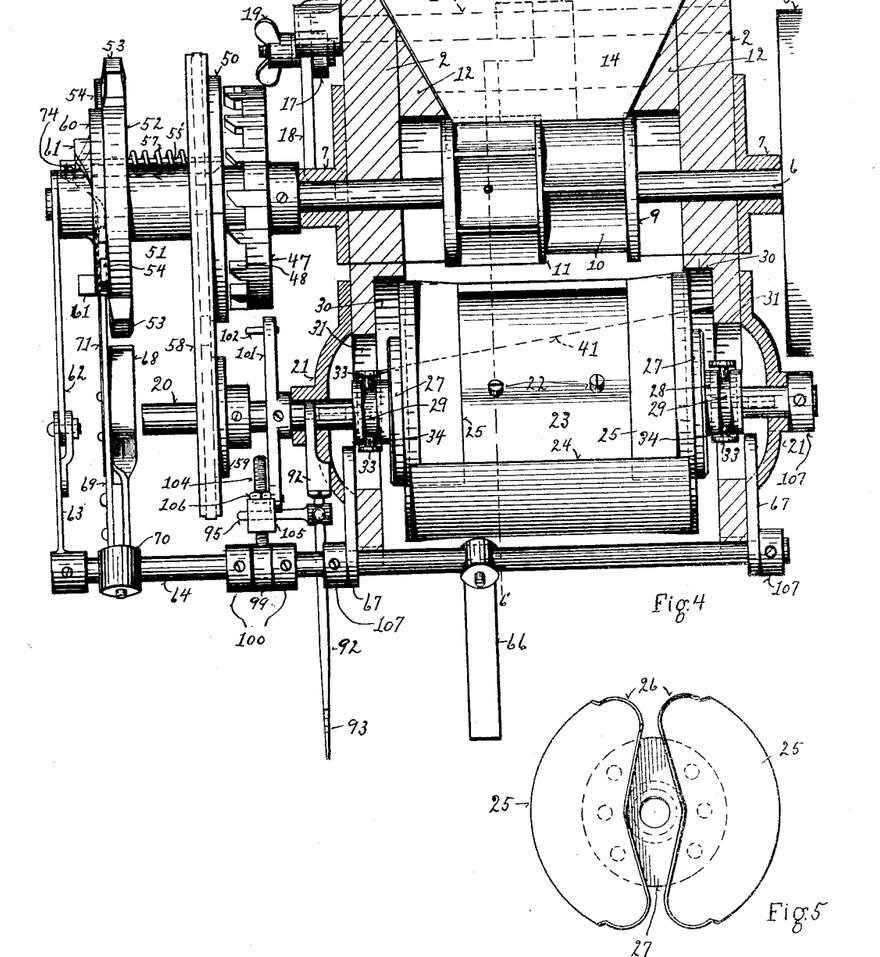
Fig. 4 is a front elevation of the lower end of the feeder, the sides of the hopper being shown in section on the planes indicated by the line 4' in Fig. 1.
Fig. 5 is a view of the movable ends of the rotary cups of the bulk feeder.

The hopper, 1, is formed at its lower end with the two sides 2, front 3, and back 4, and is divided by a cross partition 5 into two passages, the front passage being smaller for the drip or constant feed, and the back passage being larger for the bulk or intermittent feed. A shaft 6 extends across the front passage and is mounted in suitable bearings 7 secured to the sides 2 and driven by any suitable means, represented by the pulley 8. Secured rigidly to the shaft is a cylindrical block 9 having in each half a series of round bottomed cups 10 which open outwardly, the cups in the two halves being arranged alternately, as indicated, and divided by a central rib or partition 11. Secured to the inner surface of each side 2 is a block 12 whose lower end is cut out to conform to the periphery of the block 9 and which is beveled, as clearly shown in Fig. 4, to guide the commodity into the cups.

13 is a partition extending from the front 3 to, and partly around, the block 9 to prevent the commodity from falling down in front of and past this block, which is the drip stream feeder.

14 is a partition or guide, made preferably of thin sheet metal having slight flexibility, extending from the middle partition 5 down over the feeder, where it is secured to a bracket 15 which is secured to a shaft 16 mounted in the sides 2. The purpose of this guide is to prevent the passage around the feeder of any commodity other than that contained in the cups; but by raising its lower edge more of the commodity may be passed through. This adjustment may be accomplished by any suitable means, as by a handle 17 secured to the shaft 16, a slotted guide bar 18, and a bolt and thumb-nut 19 for securing the handle rigidly to the guide bar with the lower end of the guide 14 in any desired position. A shaft 20 is also mounted between the sides 2, in suitable bearings 21, and in the larger and rear passage, preferably on a level below that of the drip stream feeder. Secured to this shaft by any suitable means, as by set screws 22, is a partition 23, having thickened edges whose outer surfaces form arcs of the circle described by the limits of said edges. At each end of the partition are two blocks 25, formed to engage closely against the sides of the partition, and forming, in connection with the thickened edges of the partition, a complete circle. These end blocks are rigidly secured to plates 27, which are formed with a sleeve 28 in which is a peripheral groove 29. Each plate 27 is mounted loosely on the shaft 20 so as to have longitudinal movement thereon, the sides 2 being recessed at 30 and cut away at 31 in order to permit of such longitudinal movement. The cups, which are formed by the central partition and the end blocks, are thus made equally adjustable as to capacity by moving the ends in and out. This movement is effected by means of the levers 32, whose bifurcated ends 33 are provided with pins 34 which engage in the peripheral grooves 29, the levers being mounted in brackets 35, and being pivoted at their outer ends to the two rods 36 which extend across the rear of the frame and which are adjusted by means of the turn-buckle 37. Within the range of the movement of the ends of the cups, their capacity may be adjusted by turning the turnbuckle.

Extending around the front side of the cups is a guard 39 which prevents any of the commodity from passing around that way; and extending around the back is another guard 40 which prevents the passage of any of the commodity except that contained in the cups. In the case of lumpy or irregular and coarse commodities the guard 40 is preferably gradually spaced apart from the circle of the cups, as indicated at 43, in order to ease the load, its lower end being secured to a rod 44 extending between the sides 2. The upper edge of the latter guard is diagonally disposed, as indicated at 41, so that the cutting edges 24 of the cups shear the commodity more or less according to its nature as the cups are rotated within the guards.

42 and 45 are guides or deflectors to guide the commodity into the cups between the circular guards. The discharge opening from this bulk or intermittent feed is indicated by the numeral 46.

47 is a disk mounted rigidly on the shaft 6 and having teeth 48 arranged around its periphery and extending outwardly from the hopper or frame. Adjacent to the disk is a sprocket wheel 50 having a long sleeve 51 to the other end of which is secured a disk 52 having three radially extending lugs 53; these parts, all secured rigidly together, being mounted loosely on the shaft, but having no longitudinal movement thereon between the disk 47 and the collar 55.

Figures 1, 2, 3:
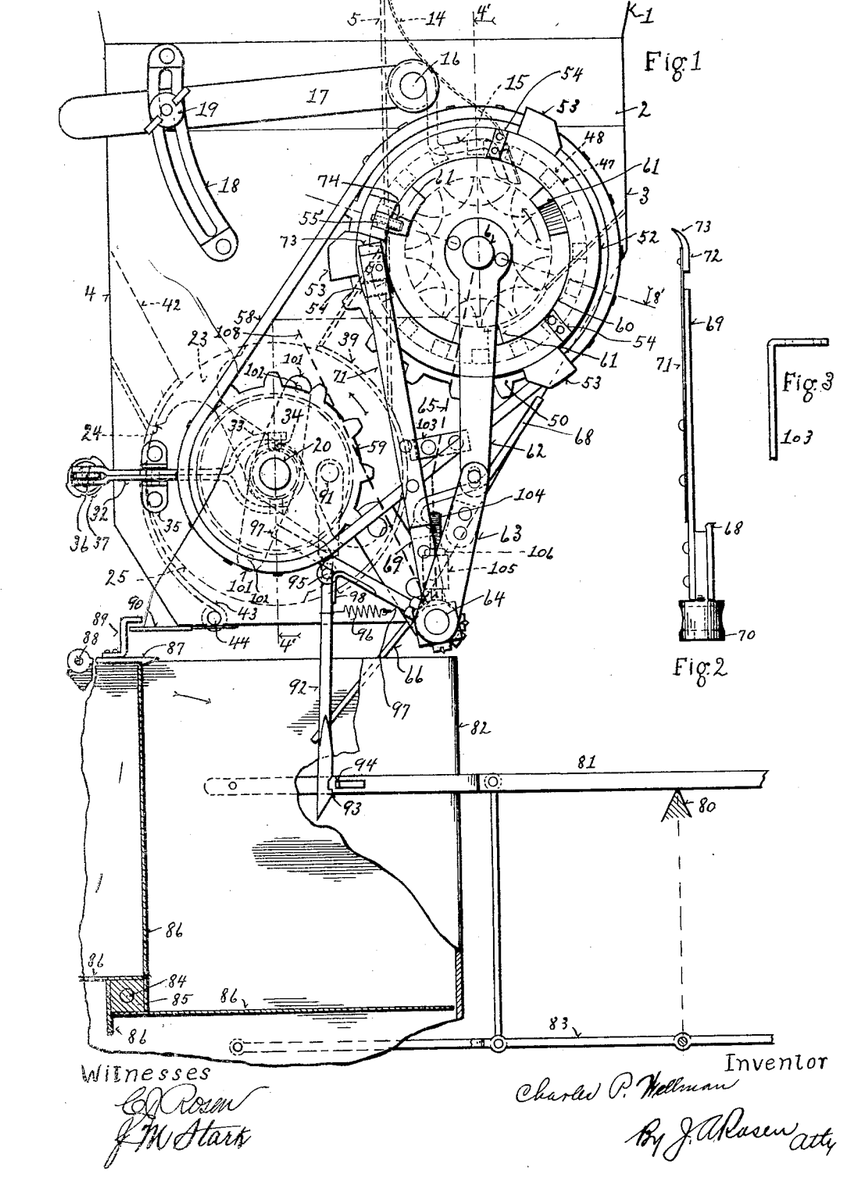
Figure 1 is a side elevation of a feeder made in accordance with the principles of my invention with certain concealed parts shown in dotted outline; this view also shows in elevation, partly in section, a part of a weighing machine to which the feeder is applicable.
Fig. 2 is a detached detail of the safety arm which stops, and holds rigidly in place, the clutch mechanism.
Fig. 3 is a detached detail of a stop not clearly shown in Fig. 1.

55′ is a pin mounted in the sprocket wheel 50 and disk 52 so as to have longitudinal movement allowing it to be engaged with and disengaged from the teeth 48. Normally it is disengaged. A coil spring 57 compressed between the disk 52 and the collar 56 tends to force the pin into engagement. When the pin is thus engaged, the sprocket wheel 50, by means of the sprocket chain 58, drives the sprocket wheel 59 secured to the shaft 20 of the intermittent feeder. Loosely mounted on the shaft 6 adjacent to the disk 52 is a smaller disk 60, having on its outer face three beveled lugs 61, in the path of which is the anti-friction roller 74 mounted on a stud secured to the pin 55′. These parts are so arranged that when the roller is bearing against the outer face of the lugs the pin 55′ is out of engagement with the teeth in the disk 47, and when off the lugs the pin is forced into engagement with the teeth by the spring 57. An arm 62 is secured rigidly at its upper end to the disk 60, and slidably at its lower end to an arm 63 which is rigidly secured to the shaft 64 mounted in bearings 67 at the lower front edge of the frame. The drawings show the parts in normal position with the bulk cups at rest. By oscillating the arm 62 to the left, say to the position indicated by the heavy dotted lines 65 in Fig. 1, the lug 61 will be moved from under the roller 74, permitting the pin to engage the teeth of the driver which thereupon drives the sprocket wheel and other parts, including the intermittent feeder, until the roller rides up on the next beveled lug 61, when the pin is again withdrawn and the intermittent feeder left at rest. The parts are so related in the specific instance shown in the drawings that the one-third turn of the shaft 6 causes a one-half turn of the shaft 20. The action of engaging the clutch is effected by a trigger 66 secured to the shaft 64. To restore these clutch operated devices to normal position, an arm 68 is employed which is rigidly secured to the shaft 64 on a hub 70, and which comes in the path of the lugs 53 when the clutch-operating arm 62 is thrown to the position 65 as described. The movement of the lug 53 against the arm 68 restores the shaft 64 and with it all rigidly connected parts to their normal positions.

Secured to the face of the disk 52 just beyond the circumference of the adjacent disk 60 are three lugs 54. Secured to the hub 70 is an arm 69 against which one of the lugs 54 lodges when the intermittent feeder has completed its phase and the clutch become disengaged. This is a safety stop to prevent the momentum from carrying the clutch mechanism and the intermittent feeder beyond their proper positions. The arm 69 is thrown away from the lug 54, as indicated by the heavy dotted line 108 in Fig. 1, when the shaft 64 is oscillated to make the clutch engage, and is restored with the same shaft to normal position in the path of the next lug 54. Secured to this arm 69 is a flat spring 71, having at its outer end a lug 72 which engages on the back side of the lug 54 to prevent rebound of the clutch mechanism and intermittent feeder, and it is beveled as at 73 to permit the lug 54 to pass thereunder and become firmly locked.

It will now be understood that with the drip stream feeder constantly running, the intermittent feeder will be operated to discharge a certain bulk of commodity as often as the trigger 66 is operated, and that upon such discharge all parts are restored to their normal positions automatically. As this mechanism is designed more especially for use in connection with an automatic weighing machine which operates the trigger, and as the mechanism also includes an element for controlling a scale locking device used to prevent the scale from tripping under the impact of the bulk from the intermittent feeder, I have shown in Fig. 1, somewhat diagrammatically, sufficient parts of such a weighing machine to illustrate the association.

80 is the fulcrum on which the scale beam 81 is pivoted.

82 is a three-sided frame pivoted to the bifurcated end of the scale beam, and forming the front and two sides of the weighing receptacle.

83 is a leveling rod. Extending across this frame is a rod 84, loosely mounted on which is a square hub 85, to which are secured, and from which extend in the lines of its faces, the four wings 86, which are formed to fit snugly between the sides and front of the frame, but being sufficiently free to rotate on their axle 84. The wings which extend from the hub upward and from the hub forwardly, form, for the time being, the back and bottom of the weighing receptacle. They are held in this position by a pawl 87 pivoted to a rod 88 secured to said frame. Secured to the pawl is a hook 89 normally free from the arm 90 secured to the rigid frame, and adapted when the weighing receptacle is depressed under the weight of the desired load therein, to engage said arm 90 and free the pawl from the wing, upon which operation, the weight of the commodity turns the wings a one-quarter revolution and the load is discharged from the receptacle. Upon relief from the load the weighing receptacle is instantly again raised to normal position by the counterweights, and the pawl stops the next wing; the scale is then ready to receive its next load. Now the trigger 66 extends in the path of the wings, so that upon the tripping of the scale the intermittent feeder is brought into operation and discharges its commodity into the weighing receptacle. Upon completion of the phase of the intermittent feeder, the parts being restored to normal position, the continued slow feed from the drip stream feeder goes on until the desired weight is obtained in the weighing receptacle, and the load is then discharged from the weighing receptacle and the intermittent feeder again brought into operation; this continues as long as the mechanism is driven, all operations, except driving the shaft 6 being automatic. The operations are so timed that the weighing receptacle is again ready to receive its load by the time the next load from the intermittent feeder reaches it.

Inasmuch as it is always desired that the intermittent feeder shall furnish an amount of commodity closely approximating, but slightly under, the final weight desired in the weighing receptacle, and as the discharge of such a large amount in bulk would cause by its impact a premature tripping of the scale, means are employed for preventing such tripping while the bulk load is being received in the weighing receptacle, and I provide means for automatically releasing the weighing receptacle or scale immediately upon the discharge of such bulk load, so that the scale will be free to act under the delicate influence of the drip stream. Pivoted to the frame, as to a pin 91 projecting from the adjacent bearing 21, is a long rod 92 having a hook 93 at its lower end for engaging an arm 94 secured to and extending out from the scale beam.

Mounted loosely on the shaft 64 between two rigidly secured collars 100 is a hub 99, to which are secured a rod 97 and a threaded rod 104, angularly disposed in relation to each other. Secured to this rod 97 is a finger 98 which, when the rod 97 is in normal position, bears against the arm 95 which is secured to and extends outward from the rod 92 and forces the hook 93 away from the arm 94. On the threaded rod 104 is a weight 105 held in any position to which it may be adjusted by a lock-nut 106.

103 is a stop to limit the upward movement of the rod 97.

Secured to the shaft 20 are two oppositely radiating arms 101, each having a pin 102, in the paths of which the rod 97 normally rests. Upon the operation of the intermittent feeder, one of the pins 102 engages the arm 97 and lifts it up toward or against the stop 103, releasing the arm 95 from the finger 98, thus permitting the spring 96 to draw the hook 93 under the arm 94 which prevents the impact of the load from the intermittent feeder from tripping the scale. The arm 97 is released by the pin 102 before the completion of its cycle movement, and the arm 97 overbalances the rod 104 and weight 105 in any of its positions, so that the arm 97 will return to its normal position by the action of gravity and thus disengage the hook 93 from the arm 94.

The purpose of the rod 104 and the weight 105 to form a counterweight to regulate the return movement of the rod 97, and thus to time the release of the scale from the hook 93 in relation to the completion of the discharge from the intermittent feeder. This timing may be delicately regulated by adjusting the weight up or down on the rod 104. By shifting the weight closer to the shaft 64 the hook will be more quickly disengaged from the scale; and by shifting the weight farther away from the shaft the action will be slower. The exact adjustment may be determined by the nature of the commodity and by the adjustment of other parts of the mechanism; and obviously, in any case it should be so timed as to effect the disengagement immediately upon the completion of the discharge from the intermittent feeder and before the drip stream has discharged enough of the commodity to secure the desired weight in the weighing receptacle. The instant of engagement of the hook 93 with the finger 94 may be varied by adjusting the arms 101 on the shaft 20. The shafts may be held against longitudinal movement by means of collars 107.

The operation of the several parts having been explained, the operation of the machine as a whole will now be described. The positions of the various parts in the drawings are those assumed when the lower one of the intermittent feed cups has discharged its load into the weighing receptacle, such load being less than the desired weight; the hook 93 has been disengaged from the scale-beam by reason of the return movement of the throw-off rod 97; and the pin 55' has been withdrawn from the path of the teeth 48, so that the constantly operating drip stream feeder does not now also drive the intermittent feeder, which remains at rest with its lower cup empty and its upper cup filled with the commodity which has run thereinto from the hopper above; and the intermittent feeder is held firmly in this position by reason of the latch 69, 71, 72 engaging one of the lugs 54. Feeding from the drip stream feeder brings the weight in the weighing receptacle to the desired point for "breaking" the scale, that is, depressing the weighing receptacle. And thereupon latch 87 releases the vertical blade 86, permitting discharge of the commodity from the receptacle. The vertical blade strikes against the rod 66, which oscillates rod 66 to its second position, which, as herebefore described in detail, "throws in" the clutch and releases the safety-stop 69, 71, 72 from the lug 54, so that the continued rotation of the shaft 6 also then drives the intermittent feed. As the commodity in the weighing receptacle commences to discharge therefrom immediately upon the first movement of the blades, the relieving of the weighing receptacle of such weight almost instantly permits the weighing machine to restore the receptacle to its first position, and this is done so rapidly that the latch 87 engages the next blade 86, thus permitting only a quarter turn of the blades,—sufficient however, to discharge the commodity just weighed and to make the receptacle ready to receive the next load. The clutch remains "thrown in" for a one-third turn of the shaft 6 and a one-half turn of the intermittent feeder. During such one-half turn, the intermittent feeder has made another discharge into the weighing receptacle; and during the corresponding one-third turn of shaft 6, the parts 53, 68 have oscillated the shaft 64 back to its first position, thus bringing the clutch mechanism into proper position for becoming disengaged, and the stops 69, 71, 72 into proper position for engaging lugs 54, at the end of the one-third turn of shaft 6, which devices being brought into engagement at the end of such one-third turn of the shaft 6, then disengage the clutch and engage said stop devices, so that the intermittent feeder is again held stationary at the end of its one-half turn. At or closely following the start of such one-half turn of the intermittent feeder, pin 102 throws back rod 97 disengaging the locking rod 92 from the finger 98, permitting locking rod 92 to bring latch 93 into engagement with the lug 94, under influence of the spring 96; and the rod 97 is timed by means of its counterweight 105 to be restored to its first position as follows: Latch 93 engages lug 94 approximately upon commencement of discharge from the intermittent feeding cup; and the counterweight is adjusted so as to restore rod 97 and finger 98 and thus to disengage latch 93 from lug 94 immediately upon the completion of such discharge. The latch thus holds up the weighing receptacle during such discharge from the intermittent feeder, and prevents the impact of such load from tipping or "breaking" the scale. These operations proceed very rapidly, and continue so long as the shaft 6 is driven and the commodity is furnished in the hoppers.

Figures 6, 7, 8, 9:
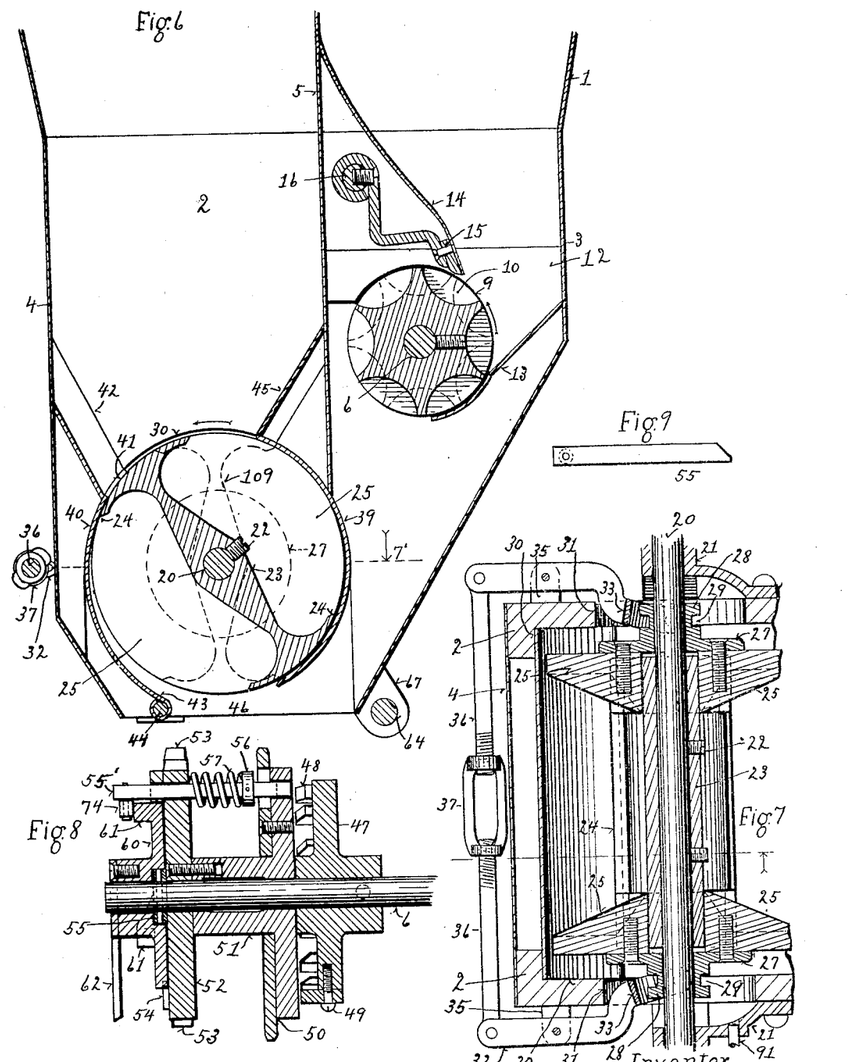
Fig. 6 is a vertical sectional elevation approximately on the plane indicated by the line 6' in Fig. 4.
Fig. 7 is a sectional plan view, partly broken off, on a plane indicated by the line 7' in Fig. 6, the cups being shown however in the position indicated by the numeral 109 in said Fig. 6.
Fig. 8 is a sectional view of the main part of the clutch mechanism on a plane indicated by the line 8' in Fig. 1.
Fig. 9 is a detail of the clutch pin.

Special attention is called to the construction of my intermittent feeder, a cross section of which is clearly shown in Fig. 6. It will be seen that the body of this feeder takes the form of a single partition 23 adapted to quick and positive action, and so formed as to combine strength with maximum capacity in a limited space. One object of the thickened edges of the partition is to admit of the use of as large an inlet and outlet for the commodity as practicable without the possibility of any flow past the partition while it is being revolved. The large outlet insures rapidity of discharge and the large inlet insures a more regular filling of the cups formed by the partition and the adjustable end blocks. The movement of the partition and the shearing surfaces of its thickened edges also materially assist in producing a uniform quantity in each cup. Another object of the thickened edges of the partition is to admit of a timing of the discharge of the intermittent load by an adjustment of the position of the partition. Obviously it may be given any suitable adjustment in relation to the inlet and outlet within the scope of the thickness of its edges. In the full outline in Fig. 6 I have shown the adjustment in approximately its extremely retarded position to insure complete discharge. A quicker discharge will be obtained by adjusting the partition to the position shown in the dotted outline 109, in which the discharge will begin promptly upon the first movement of the shaft 20. For many commodities the latter is the preferable adjustment.

Having thus described my invention, what I claim, and desire to secure by Letters Patent, is:—

1. In combination, a frame having two passages there-through, a drip stream feeder in one of the passages, mechanism for constantly operating the drip stream feeder, a rotary bulk feeder in the other of the passages, mechanism for operating said bulk feeder, a clutch between said two mechanisms whereby the first-named mechanism drives the second-named mechanism, means for automatically disengaging the clutch members from each other, a weighing machine having a weighing receptacle, means operable by said weighing machine for causing the clutch members to engage with each other, a device for preventing the tripping of a weighing machine while the weighing receptacle is receiving the load discharged from the bulk feeder, and means actuated by gravity and associated with the second-named mechanism for releasing the weighing machine from said device.

2. In combination, a weighing machine having a weighing receptacle, a frame having two contiguous and substantially vertical passages therethrough, adapted to discharge their contents into a common receptacle, said shaft extended across one of said passages, a series of outwardly opening cups mounted on said shaft, said cups being arranged in two series around the shaft in alternate relation, means for constantly driving said shaft, guards secured to the frame for preventing the passage of commodity past the cups except that contained in the cups, a shaft mounted in the other passage, outwardly opening cups mounted on the shaft, guards secured to the frame and partly surrounding said cups to prevent the passage of any commodity thereby except that contained in the cups, driving mechanism between the two shafts whereby the second-named shaft is driven by the first-named shaft, a clutch in said driving mechanism, means for automatically disengaging the clutch members from each other, means operable by said weighing machine for causing said clutch members to engage with each other, means for supporting said weighing receptacle while it is receiving the load from the second passage, means actuated by gravity for releasing the weighing receptacle from such support immediately after such discharge and before the operation of the first-named cups have completed the discharge of the desired final weight of the commodity into said receptacle, and means associated with the last-named shaft for disengaging the said releasing means from said supporting means approximately simultaneously with the commencement of the discharge from each of the second-described cups.

3. In a machine of the kind described, the combination with a weighing machine of a frame having two substantially vertical passages therethrough, a drip stream feeder in one of the said passages and means for constantly driving said drip stream feeder, a rotary feeder in the other passage adapted to discharge a commodity therefrom in measured volumes, means for intermittently operating the said rotary feeder, and a tripping device adapted to be actuated by said weighing machine for bringing said intermittently operating means into action.

4. In a machine of the kind described, the combination with a weighing machine of a frame having two passages therethrough, a drip stream feeder in one of said passages, a rotary bulk feeder in the other passage adapted to discharge therefrom a quantity of a commodity measured as to volume, means for constantly operating the drip stream feeder, and means for intermittently operating the bulk feeder, and a tripping device adapted to be actuated by said weighing machine for bringing said intermittently operating means into action.

5. In a machine of the kind described the combination with a weighing machine of a frame having two passages therethrough, a drip stream feeder in one of said passages, means including a shaft for constantly driving said drip stream feeder, a rotary bulk feeder in the other passage including a shaft, suitable transmission mechanism between the two shafts including the two members of a clutch, a tripping device adapted to be actuated by said weighing machine for causing the clutch members to engage with each other, and automatic mechanism associated with the clutch for disengaging the clutch members from each other.

6. In a machine of the kind described the combination with a weighing machine of a frame having two passages therethrough, a drip stream feeder in one of the passages, means including a shaft for constantly driving said feeder, a rotary bulk feeder in the other passage and including a shaft, a toothed wheel rigidly secured to the first-named shaft, a sprocket wheel loosely mounted on the same shaft adjacent to the toothed wheel, and having an elongated sleeve, a disk secured to said elongated sleeve, said disk having radially extending arms and having lugs on its face, a pin extending between the sprocket wheel and disk and loosely mounted therein so as to have reciprocating movement into and out of engagement with the toothed wheel, a spring tending naturally to force the pin into such engagement, a disk mounted loosely on the shaft adjacent to the first-named disk and having lugs capable of withdrawing the pin from such engagement, an arm extending from said disk for oscillating said disk on the shaft to release said pin from the lugs thereon, a sprocket wheel secured rigidly to the second-named shaft, a sprocket chain connecting the two sprocket wheels, a third shaft mounted in the frame, an arm rigidly secured thereto and slidably connected with the arm extending from the second-named disk, a second arm rigidly secured to the last-named shaft and extending into the path of said radially extending arms, a third arm rigidly secured to the last-named shaft and capable of engaging the lugs on the face of the first-named disk to prevent movement of the sprocket wheels, and a trigger arm secured to the last-named shaft, adapted to be actuated by said weighing machine for oscillating the shaft and the arms secured thereto, thereby causing the pin to engage with the toothed wheel and release the sprocket wheels from the movement-preventing arm, the said radially extending arms being adapted by their respective engagements with the said second arm to restore said parts to normal position, and the pin being adapted by engagement with its respective engaging lugs to be withdrawn from engagement with the toothed wheel.

7. In a machine of the kind described, the combination of a drip stream feeder and a rotary bulk feeder, each feeder having a shaft, means for constantly driving the drip stream feeder, suitable transmission mechanism between the two shafts whereby the first-named shaft drives the second-named shaft, said transmission including a toothed wheel rigidly secured to the first-named shaft, a rotary element loosely mounted on the same shaft adjacent to the toothed wheel, a reciprocating pin mounted in the rotary element, a spring tending to force the pin into engagement with the toothed wheel, an oscillating member loosely mounted on the same shaft and having lugs which engage the pin and withdraw it from such engagement, said oscillating element being capable of withdrawing the lug from engagement with the pin, and said pin being capable by motion of the transmission to engage with the lug, together with means for actuating said oscillating element and for automatically restoring it to its normal position.

8. In a machine of the kind described, the combination of a drip stream feeder having a shaft, a toothed wheel mounted rigidly on the shaft, a rotary bulk feeder having a shaft, transmission mechanism between the two shafts including a rotary element loosely mounted on the first-named shaft adjacent to the toothed wheel, a reciprocating pin mounted in the rotary element and disposed parallel to the shaft, a spring for forcing the pin into connection with the toothed wheel, an element mounted loosely on the shaft and having a beveled lug capable of engaging the pin and withdrawing it from such connection, and means for moving the lug out of engagement with the pin, said pin being adapted upon motion of the transmission to engage again with said lug and become withdrawn from such connection with the toothed wheel.

9. In a machine of the kind described, the combination with a weighing machine of a drip stream feeder and a rotary bulk feeder, means for constantly driving the drip stream feeder, means adapted to be actuated by said weighing machine for intermittently driving the bulk feeder, and stop coöperating with said intermittent driving mechanism for holding the rotary bulk feeder rigidly in one position during the intervals between its phases.

10. In a machine of the kind described, the combination with a weighing machine of a drip stream feeder, a rotary bulk feeder, means for constantly driving the drip stream feeder, means controlled by said weighing machine for intermittently operating the bulk feeder, said intermittently operating means including a rotary element having a lug, a pivoted arm against which said lug engages to stop the forward movement of said intermittently operating means, a spring latch engaging the rearward side of said lug to prevent rebound of said intermittently operating means, and means controlled by said weighing machine for moving said arm and latch out of their said engaging positions.

11. In combination, a frame having two passages therethrough, a drip stream feeder in one of said passages, means for constantly operating said feeder, a shaft extending across the other of said passages, outwardly opening cups mounted on the shaft, guards secured to the frame and partly surrounding the cups and having openings above and below the shaft, means for intermittently driving the shaft, the ends of the cups being movable longitudinally of the shaft to increase and decrease the capacity of the cups, and means for shifting the ends longitudinally of the shaft.

12. In combination, a frame having two passages therethrough, a drip stream feeder in one of said passages, means for constantly operating said feeder, a shaft extending across the other of said passages, outwardly opening cups mounted on said shaft, each cup having a cutting edge, guards secured to the frame and extending partly around the cups and having openings above and below the shaft, the upper end of the guard on the side of the passage toward which the upper cup rotates being diagonally disposed and adapted to coöperate with the cutting edges of the cups to shear the commodity upon rotation of the shaft and cups.

13. In combination, a frame having two passages therethrough, a drip stream feeder in one of said passages, means for constantly operating said feeder, a shaft extending across the other of said passages, means for intermittently operating said shaft, a partition secured on the shaft within the passage, end blocks fitting against said partition and forming therewith cups whose outer limits are circular and concentric with the shaft, said end blocks being movable longitudinally of the shaft to increase and decrease the capacity of the cups, and guards partly surrounding said cups and having openings above and below the shaft.

14. In combination, a frame having two passages therethrough, a drip stream feeder in one of said passages, means for constantly operating said feeder, a partition within the other of the passages, said partition being rotatable on a substantially horizontal axis, said partition having thickened edges the outward surfaces of which form arcs of the circle described by the limits of said edges and the forward edges of said surfaces forming cutting edges, means for rotating said partition on its axis and blocks adjacent to the ends of said partition and adapted to engage its sides, said blocks being adjustable longitudinally of said partition and having their outer edges shaped to coöperate with the arced edges of said partition to form a substantially complete circle.

15. In a machine of the kind described, the combination with a weighing machine of a drip stream feeder, a bulk feeder, means for operating the drip stream feeder, means for intermittently operating the bulk feeder, said last-named means including a clutch having a loosely mounted member, and a stop for the loosely mounted member to stop the forward movement of said loosely mounted member, a lug and spring mounted on said stop to prevent rearward movement of said member, and means for automatically moving said stop and lug into and out of engagement with said member.

16. In a machine of the kind described, the combination with a weighing machine, a drip stream feeder, a bulk feeder, and means for constantly driving the drip stream feeder; of a clutch having two interlockable members, one of said members being direct connected to said drip stream feeder driving means, suitable gearing connecting the other member with said bulk feeder, said second-named member having a rotary element with a lug thereon, a stop resting normally in the path of said lug and adapted to stop said second member and hold it in the position in which it is stopped, together with means for automatically actuating said stop into and out of stopping position and so adjusted as to actuate said stop out of stopping position when the clutch members are actuated into their interlocking position and so that said stop stops said second-named member when said clutch members are disengaged from each other.

17. In a machine of the kind described, the combination with a weighing machine having a weighing receptacle, a drip stream feeder, a rotary bulk feeder, and means for constantly operating the drip stream feeder and for intermittently operating the bulk feeder; of a means for preventing the tripping of the weighing machine, a means actuated by the bulk feeder to bring said preventing means into position for preventing the tripping of the weighing machine under impact of the discharge from the intermittent feeder, and a means including a device having retarded movement for automatically freeing the weighing machine from said tripping-preventing means after the discharge from the bulk feeder so that the weighing machine is free to act under influence of the drip stream.

18. In a machine of the kind described, the combination with a weighing machine having a weighing receptacle, a drip stream feeder, means for constantly driving the drip stream feeder, a feeder for intermittently discharging into the receptacle a large quantity approximating and slightly under the desired weight, and means for operating the last-named feeder; of a lock for locking the weighing machine against weighing movement under influence of the impact of the discharge from the last-named feeder, and automatic means for bringing said lock into locking position upon commencement of the discharge from the intermittent feeder and for releasing said lock from said weighing machine immediately after the said discharge has been received in said receptacle.

19. In a machine of the kind described, the combination with a weighing machine having a weighing receptacle, a drip stream feeder and means for operating the same, a feeder for intermittently discharging into the receptacle a large quantity approximating and slightly under the desired weight, and means for operating said intermittent feeder; of a lock for locking the weighing machine against weighing movement, and automatic means for bringing said lock into locking position when the discharge is made from the intermittent feeder to prevent weighing movement under influence of the impact therefrom, and for withdrawing said lock from locking position upon completion of the reception of said discharge into said receptacle.

20. In a machine of the kind described, the combination with a weighing machine, a feeder for intermittently discharging into the weighing machine in bulk a large quantity of commodity, a locking device for preventing weighing movement of the weighing machine during the reception thereinto of such large quantity in bulk, and automatic means controlled by said feeder for bringing said device into locking position, and a time element actuated by said feeder and having an adjustable weight for bringing said locking device into unlocking position.

21. In a machine of the kind described, the combination with a weighing machine, and a feeder for discharging commodity thereinto; of a locking device for preventing the tripping of the weighing machine, and means between the feeder and said locking means for controlling said locking means and including a gravity operated time element for releasing the locking device from the weighing machine.

22. In a machine of the kind described, the combination with a weighing machine and a feeder for discharging commodity thereinto; of a locking device controlled by the feeder for locking the weighing machine against weighing movement while receiving the discharge of commodity thereinto.

23. In a machine of the kind described, the combination with a weighing machine and a feeder for discharging commodity thereinto; of a locking device for locking the weighing machine against weighing movement, means for bringing said locking device into locking position, and a means including a counterbalanced timing element for bringing said locking device out of locking position.

In testimony whereof I have affixed my signature to this specification in presence of witnesses.

CHARLES P. WELLMAN.

Witnesses:
ELLENA T. MCHALE,
LOUIS M. TODD.

Copies of this patent may be obtained for five cents each, by addressing the "Commissioner of Patents, Washington, D. C."